(12) United States Patent
Choi et al.

(10) Patent No.: US 12,283,853 B2
(45) Date of Patent: Apr. 22, 2025

(54) NON-ROTATING TYPE DIRECT CURRENT GENERATOR

(71) Applicants: Woo Hee Choi, Seoul (KR); Hyung Ju Yoo, Seoul (KR); Nan Kyung Hwang, Seoul (KR)

(72) Inventors: Woo Hee Choi, Seoul (KR); Hyung Ju Yoo, Seoul (KR); Nan Kyung Hwang, Seoul (KR); Sung Kwon Yu, Seoul (KR)

(73) Assignees: Woo Hee Choi, Seoul (KR); Hyung Ju Yoo, Seoul (KR); Nan Kyung Hwang, Seoul (KR)

( * ) Notice: Subject to any disclaimer, the term of this patent is extended or adjusted under 35 U.S.C. 154(b) by 0 days.

(21) Appl. No.: 17/915,691

(22) PCT Filed: Mar. 26, 2021

(86) PCT No.: PCT/KR2021/003803
§ 371 (c)(1),
(2) Date: Sep. 29, 2022

(87) PCT Pub. No.: WO2021/201518
PCT Pub. Date: Oct. 7, 2021

(65) Prior Publication Data
US 2024/0364196 A1     Oct. 31, 2024

(30) Foreign Application Priority Data

Mar. 30, 2020  (KR) .................. 10-2020-0038668
Mar. 30, 2020  (KR) .................. 10-2020-0038669

(51) Int. Cl.
*H02K 19/26*  (2006.01)
*H02K 1/16*   (2006.01)
*H02K 3/30*   (2006.01)

(52) U.S. Cl.
CPC ............... *H02K 19/26* (2013.01); *H02K 1/16* (2013.01); *H02K 3/30* (2013.01)

(58) Field of Classification Search
CPC .......... H02K 1/16; H02K 19/26; H02K 15/02; H02K 1/02; H02K 15/024; H02K 15/12;
(Continued)

(56) References Cited

FOREIGN PATENT DOCUMENTS

| JP | 2000353627 | 12/2000 |
|----|------------|---------|
| KR | 20140078732 | 6/2014 |

(Continued)

OTHER PUBLICATIONS

Translation of KR101913746B1 (Year: 2018).*

*Primary Examiner* — Terrance L Kenerly
*Assistant Examiner* — Theodore L Perkins
(74) *Attorney, Agent, or Firm* — Revolution IP, PLLC

(57) ABSTRACT

The present invention relates to a non-rotating direct current electric generator capable of generating a direct current with high efficiency without rotating a field magnet or an armature. The non-rotating direct current electric generator according to the present invention is a direct current electric generator generating a direct current, and is characterized by comprising a drive unit and a generator unit, wherein the generator unit comprises: a rod-shaped core member; a field magnet having a first hollow part in the center part along with the winding of an electric line, and disposed on the outside of the core member through the first hollow part; and an armature having a second hollow part in the center part along with the winding of an electric line, and disposed on the outside of the core member through the first hollow part, wherein a pole piece is provided between the field magnet and the armature, an insulating plate is disposed between the field magnet and the pole piece and between the armature and the pole piece, and the drive unit supplies a field current (Continued)

to the generator unit on the basis of an alternating current from an alternating current power source.

9 Claims, 10 Drawing Sheets

(58) Field of Classification Search
CPC .... H02K 15/03; H02K 2213/03; H02K 1/148; H02K 15/022; H02K 1/276; H02K 1/146; H02K 11/33; H02K 16/02; H02K 21/16; H02K 3/325; H02K 3/42; H02K 3/522; H02K 7/083; H02K 7/14; H02K 1/27; H02K 1/2706; H02K 1/2791; H02K 1/18; H02K 1/187; H02K 15/028; H02K 5/04; H02K 1/00; H02K 1/12; H02K 1/22; H02K 2201/09; H02K 1/04; H02K 1/06; H02K 1/14; H02K 1/2766; H02K 15/10; H02K 19/08; H02K 21/12; H02K 21/24; H02K 3/30; H02K 5/128; H02K 7/1807; H02K 1/17; H02K 1/2773; H02K 1/2786; H02K 11/00; H02K 15/0012; H02K 15/026; H02K 15/04; H02K 15/0421; H02K 15/064; H02K 15/14; H02K 3/12; H02K 3/28; H02K 33/16; H02K 35/02; H02K 7/09; H01F 27/324
USPC ........................................................ 310/195
See application file for complete search history.

(56) References Cited

FOREIGN PATENT DOCUMENTS

| | | | |
|---|---|---|---|
| KR | 101913746 | 10/2018 | |
| KR | 101913746 B1 * | 10/2018 | .............. H02M 7/54 |

* cited by examiner

NON-ROTATING TYPE DIRECT CURRENT GENERATOR

BACKGROUND

The present invention relates to a non-rotating type direct current (DC) generator, and more particularly, to a non-rotating type direct current (DC) generator capable of generating direct current with high efficiency without rotating a field magnet or an armature.

An electric generator mainly refers to a device that converts mechanical energy into electrical energy, and it is also referred to as a DC generator, a synchronous generator, and an induction generator according to its operation method or operating principle. A generator basically includes an armature for generating and outputting a current and a field magnet for generating a magnetic field. The generator generates a current flow in the armature by rotating the armature with respect to the field magnet or rotating the field with respect to the armature while forming a magnetic field by supplying DC power to the field magnet. At this time, the method of rotating the armature is called a rotating armature type, and the method of rotating the field magnet is called a rotating field magnet type. In such a rotary generator, rotational driving of an armature or field magnet is performed by a separate energy source. As the energy source, an appropriate one is employed depending on the intended use, but generally natural energy such as hydraulic power, wind power, and tidal power, or driving means such as a turbine, an engine, and a motor are used.

In general, direct current has the advantage of being able to easily store electricity, but has a disadvantage in that it is difficult to achieve high power including step-up. In contrast, alternating current has a very low storage property, but has an advantage in that it is easy to increase the voltage and increase the power. As one preferred application of the generator, there is a system configured to generate various AC power by rotating a field magnet or an armature using a stored DC power source such as a battery or another AC power source. Such a power system or power conversion system is widely used as an emergency power means in industries requiring high power, such as hospitals or factories. In addition, such an electric power system may be very usefully employed in an electric vehicle that requires generation of various driving torques according to circumstances while using electricity as an energy source.

As another application method of the generator, there is a system to generate direct current power by generating an induced current through rotation of a field magnet or armature and outputting it through a commutator or a commutator element. Such a power system or power conversion system is widely used in a power supply system for devices using DC power, such as automobiles and aircraft, and a battery charging system for charging a battery used in such devices or facilities.

Conventional generators basically require rotational driving of an armature or a field magnet. These structural features inevitably lead to an increase in the manufacturing cost of the generator along with the structural and mechanical complexity of the generator. In particular, since a large amount of energy loss occurs due to mechanical friction or the like when the armature or field magnet rotates, there is a limit in increasing the power generation efficiency and power conversion efficiency of the generator. Furthermore, in the case of a DC generator, an additional commutator or a commutator element is required to rectify the induced current, so there is a disadvantage in that the structure and weight of the generator are worse than that of the AC generator.

Korean Patent Registration No. 10-1913746 (Title of the Invention: AC power generator with adjustable frequency and voltage), Korean Patent Laid-Open No. 10-2014-0078732 (Title of the Invention: Power Conversion Device), Japanese Patent Laid-Open No. 2000-353627 (Title of the Invention: Insulation converter transformer and switching power supply circuit), etc., have introduced devices or systems designed to perform power conversion without rotating the armature or field magnet. Here, the Korean Patent Registration No. 10-1913746 is particularly noteworthy. In this patent, the frequency and power of the AC power obtained from the armature can be easily adjusted by repeatedly and alternately stacking the armature and the field magnet and controlling the pulse width of the DC power supplied to the field magnet.

SUMMARY OF THE INVENTION

An object of the present invention is to provide a non-rotating type direct current (DC) generator capable of generating DC power without using a commutator as well as not rotating an armature or a field magnet.

Another technical object of the present invention is to provide a non-rotating type direct current (DC) generator capable of generating DC power with high efficiency.

Another object of the present invention is to provide a high-efficiency AC-DC power converter.

Another technical object of the present invention is to provide a non-rotating type direct current (DC) generator that can be used as a DC power converter.

According to a preferred embodiment of the present invention for achieving the above object, it is provided to a non-rotating type direct current (DC) generator for generating a DC current, comprising a drive unit and a generator unit, wherein the generator unit includes a round bar-shaped core member, a field magnet in which an electric line is wound and a first hollow portion is formed in the central portion, the field magnet disposed on the outside of the core member through the first hollow, an armature in which an electric line is wound and a second hollow portion is formed in the central portion, the armature disposed on the outside of the core member through the second hollow portion, a pole piece which is provided between the field magnet and the armature, and insulating plates which are disposed between the field magnet and the pole piece and between the armature and the pole piece, and wherein the drive unit supplies the field magnet current to the generator unit on the basis of the alternating current of AC power source.

In addition, according to another embodiment of the present invention for achieving the above object, it is provided to a non-rotating type direct current (DC) generator for generating a DC current, comprising a round bar-shaped core member, a field magnet in which an electric line is wound and a first hollow portion is formed in the central portion, the field magnet disposed on the outside of the core member through the first hollow, an armature in which an electric line is wound and a second hollow portion is formed in the central portion, the armature disposed on the outside of the core member through the second hollow portion, a pole piece which is provided between the field magnet and the armature, and insulating plates which are disposed between the field magnet and the pole piece and between the armature and the pole piece, and wherein the field magnet is driven by the field magnet current of DC power source, and the field magnet current has a constant frequency.

According to the present invention as described above, there is an effect that according to the present invention having the above configuration, a desired DC current is generated from the armature by stacking and arranging the field magnet and the armature with respect to the core member and appropriately supplying the field magnet current to the field magnet. Accordingly, in the present invention, a mechanical structure for rotationally driving a field magnet or armature is unnecessary, and since the commutator can be removed, the structure of the DC generator is greatly simplified and lightened.

In addition, in the present invention, since the DC generator is configured as a non-rotating type, energy loss due to friction generated during the rotation of the field magnet or armature is minimized. Accordingly, the power generation efficiency of the generator is greatly improved.

BRIEF DESCRIPTION OF DRAWINGS

The drawings attached to this specification are for efficiently explaining the technical configuration of the present invention. It should be understood that some components in the drawings may be simplified or exaggerated for an efficient understanding of the present invention.

FIG. 13 is a view showing the input terminals 12-1 and 12-2 of the first and second field magnets 10-1 and 10-2 in the case of selectively driving the first and second field magnets 10-1 and 10-2 in FIG. 12 is a waveform diagram showing an example of the field magnet current supplied through.

DETAILED DESCRIPTION OF THE INVENTION

Figure 1:
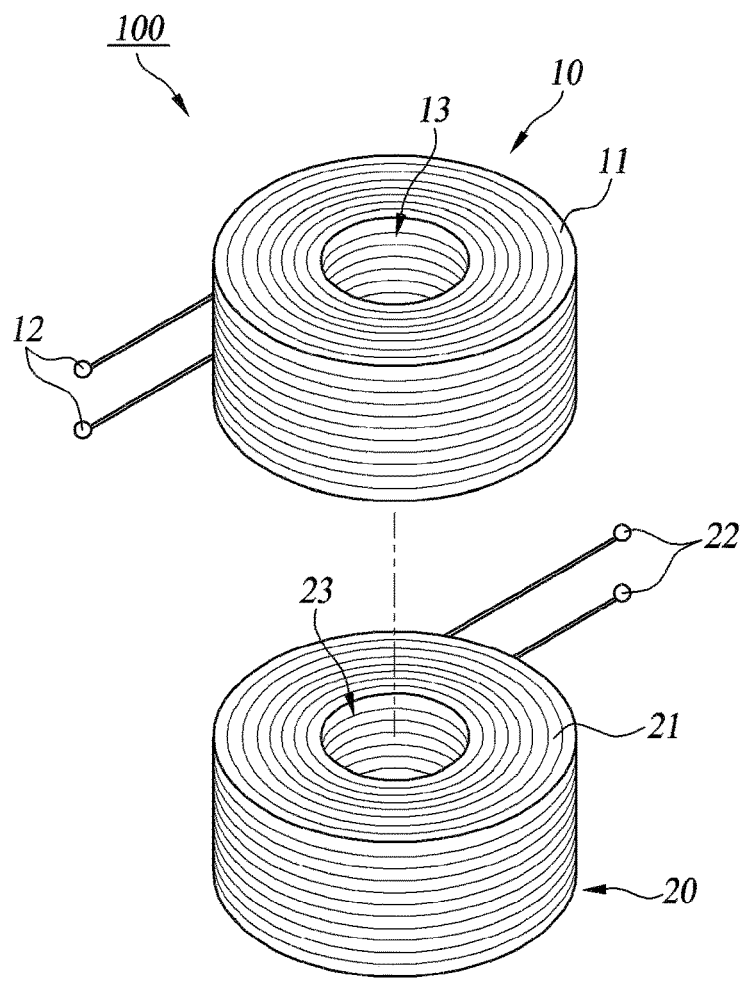
FIG. 1 is a block diagram showing a generator unit 100 or a DC generator according to a first embodiment of the present invention.

According to a preferred embodiment of the present invention for achieving the above object, it is provided to a non-rotating type direct current (DC) generator for generating a DC current, comprising a drive unit and a generator unit, wherein the generator unit includes a round bar-shaped core member, a field magnet in which an electric line is wound and a first hollow portion is formed in the central portion, the field magnet disposed on the outside of the core member through the first hollow, an armature in which an electric line is wound and a second hollow portion is formed in the central portion, the armature disposed on the outside of the core member through the second hollow portion, a pole piece which is provided between the field magnet and the armature, and insulating plates which are disposed between the field magnet and the pole piece and between the armature and the pole piece, and wherein the drive unit supplies the field magnet current to the generator unit on the basis of the alternating current of AC power source.

In addition, according to another embodiment of the present invention for achieving the above object, it is provided to a non-rotating type direct current (DC) generator for generating a DC current, comprising a round bar-shaped core member, a field magnet in which an electric line is wound and a first hollow portion is formed in the central portion, the field magnet disposed on the outside of the core member through the first hollow, an armature in which an electric line is wound and a second hollow portion is formed in the central portion, the armature disposed on the outside of the core member through the second hollow portion, a pole piece which is provided between the field magnet and the armature, and insulating plates which are disposed between the field magnet and the pole piece and between the armature and the pole piece, and wherein the field magnet is driven by the field magnet current of DC power source, and the field magnet current has a constant frequency.

In addition, a hollow is provided along the longitudinal direction at the central portion of the core member.

In addition, an insulating material is further disposed between the core member and the first or second hollow part.

In addition, the insulating plate is composed of a high elasticity material.

In addition, the insulating plate is composed of PET.

In addition, the core member is characterized in that the heat treatment is performed while being composed of pure iron.

In addition, the pole piece is characterized in that the heat treatment is performed while being composed of pure iron.

In addition, in the heat treatment, the core member or the pole piece is put in a kiln together with the solid fuel, the solid fuel is burned to heat the core member or the pole piece to a certain temperature or higher, and the core member or the pole piece is naturally combined with the burned solid fuel and is carried out by cooling.

In addition, the solid fuel is the white coal.

In addition, the core member or the pole piece is characterized in that the surface treatment with oil is performed.

In addition, the plurality of the field magnet and the armature is provided, and the field magnet and the armature are alternately arranged.

In addition, the plurality of armatures is connected in series with each other.

In addition, the plurality of field magnets is divided into a first field magnet group and a second field magnet group, and the first field magnet group and the second field magnet group are alternately driven.

In addition, the plurality of field magnets is divided into a first field magnet group and a second field magnet group, and the first field magnet group and the second field magnet group are respectively driven synchronously.

In addition, the first or second field magnet group is characterized in that it is connected in series with respect to the field magnet current input, respectively.

In addition, the first or second field magnet group is characterized in that each is connected in parallel with respect to the field magnet current input.

Hereinafter, an embodiment of the present invention will be described with reference to the drawings. However, the examples described below are illustrative of preferred embodiments of the present invention, and the examples of these examples are not intended to limit the scope of the present invention. Those skilled in the art will readily understand that the present invention can be implemented with various modifications without departing from the technical spirit thereof.

First, the basic concept of the present invention will be described. As described above, the basic principle of the generator is to generate a flow of induced current in the armature by changing the magnetic field (magnetic flux) applied to the armature. Here, as a method of changing the magnetic flux to the armature, it is applied to the armature by externally supplying DC power to the magnetic field to generate a magnetic field (magnetic flux), and changing the relative position between the magnetic field and the armature, that is, rotating the magnetic field or the armature. It changes the magnetic field (magnetic flux). This method is currently employed in most generators, and as described above, as the magnetic field magnet or the armature is rotated and driven, the generator structure is complicated and the power generation efficiency is lowered.

Another way to change the magnetic flux in the armature is to change the field magnet current supplied to the field magnet to change the magnetic field (magnetic flux) itself generated by the field magnet. In this method, if an appropriate method for changing the field magnet current is provided, it is possible to prevent the conventional problems, that is, the complexity of the generator structure and the decrease in efficiency due to rotational driving of the armature or field magnet. In the present invention, this method is referred to as a non-rotating type as a concept relative to the conventional rotating armature type or rotating field magnet type, and a generator using this method is referred to as a non-rotating type generator.

FIG. 1 is a block diagram showing a generator unit 100 or a non-rotating type direct current (DC) generator according to a first embodiment of the present invention. In the drawing, the generator unit 100 or DC generator includes a field 10 and an armature 20. The field magnet 10 and the armature 20 are each formed by winding conductive lines 11 and 21 coated with an insulating material. Here, as the conductive line, for example, a polyurethane copper wire, a polyester copper wire, a polyamide imide (PAI) copper wire, a polyester imide copper wire, etc. may be preferably employed. The field magnet 10 is provided with an input terminal 12 for supplying a field magnet current, and the armature 20 is provided with an output terminal 22 for drawing an induced current, that is, a current generated in the armature 20. The turns ratio of the field magnet 10 and the armature 20 will be appropriately set according to the field magnet power and the output power.

The field magnet 10 and the armature 20 are formed in a cylindrical shape with hollow parts 13 and 23 in the central part as a whole. At this time, the shapes of the field magnet 10 and the armature 20 are not limited to specific ones. For example, the field magnet 10 and the armature 20 may be configured in an elliptical shape or a polygonal shape. The field magnet 10 and the armature 20 are arranged in a vertical direction or a horizontal direction so that the hollow parts 13 and 23 are matched with each other. Preferably, the field magnet 10 and the armature 20 are disposed in a position that is as close as possible to each other within a range in which leakage current or sparks do not occur between them. The arrangement positions of the field magnet 10 and the armature 20 are not specified. For example, when the field magnet 10 and the armature 20 are arranged in a vertical direction, the field magnet 10 may be arranged above or below the armature 20. In addition, when the field magnet 10 and the armature 20 are arranged in the horizontal direction, the field magnet 10 may be arranged on the left or right side of the armature 20. The field magnet 10 is suitably disposed on one side of the armature 20.

Alternatively, the field magnet current is supplied to the field magnet 10 through the input terminal 12. Although not specifically shown in the drawing, a current source such as a battery is coupled to the input terminal 12 to supply the field magnet current, and the duty ratio of the field magnet current supplied through the input terminal 12 is between the current source and the input terminal 12. Appropriate means for controlling the generator output may be combined. Such means may include a pulse width modulation (PWM) control means and a switching means such as an insulated gate bipolar transistor (IGBT). The supply and control of the field current through the switching means and the PWM control means are described in Korean Patent Registration No. 10-1913746.

Figure 2:
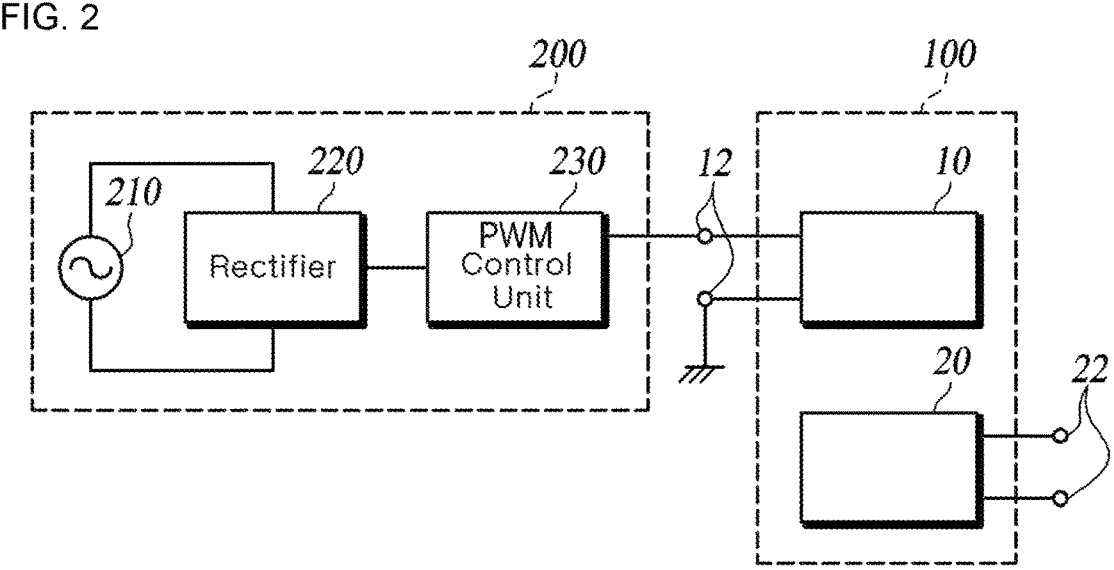
FIG. 2 is a block diagram showing the configuration of a non-rotating type direct current generator employing the generator unit 100 of FIG. 1.

FIG. 2 is a block diagram showing the configuration of a non-rotating type DC generator including the generator unit 100. In the drawing, the DC generator is provided with a drive unit 200 for properly driving the generator unit 100 together with the generator unit 100 described above. In the drawing, the drive unit 200 includes an AC source 210 for supplying a field magnet current, a rectifier 220 for half-wave rectification or full-wave rectification of the AC current supplied from the AC source 210, and a PWM (Pulse Width Modulation) control unit 230 for controlling the DC power output from the generator unit 100 by controlling the pulse width, that is, the duty ratio, of the field magnet current supplied from the generator unit 100.

In the above configuration, the drive unit 200 rectifies the AC current from the AC source 210 and supplies it to the generator unit 100. The output current of the drive unit 200 is coupled to the input terminal 12 of the generator unit 100. The field magnet current supplied to the input terminal 12 of the generator unit 100 flows through the line 11 of the field magnet 10 in FIG. 1. A magnetic field is formed in the vertical direction to a progress direction of the line 11 corresponding to the winding direction of the line 11. The direction in which the magnetic field is formed can be defined by Ampere's right hand screw rules.

The magnetic field generated in the field magnet 10 is linked in a vertical direction with respect to the line 21 of the armature 20. In addition, current flow is generated in the line 21 of the armature 20 in a predetermined direction corresponding to the direction of the magnetic field and the winding direction of the line 21. At this time, the magnitude of the induced current will correspond to the strength of the magnetic field and its change amount. And the induced current flowing through the line 21 is output as a generated current of the generator unit 100 to the outside through the output terminal 22.

In the above configuration, the field magnet 10 and the armature 20 are fixedly arranged in adjacent positions, and the AC current is rectified in the drive unit 200 and then supplied it to the generator unit 100 as a field magnet current, so that DC current is output through the generator unit 100, and the output power of the generator unit 100 can be appropriately adjusted by controlling the duty ratio of the field magnet current supplied from the driving unit 200 to the generator unit 100.

Figure 3:
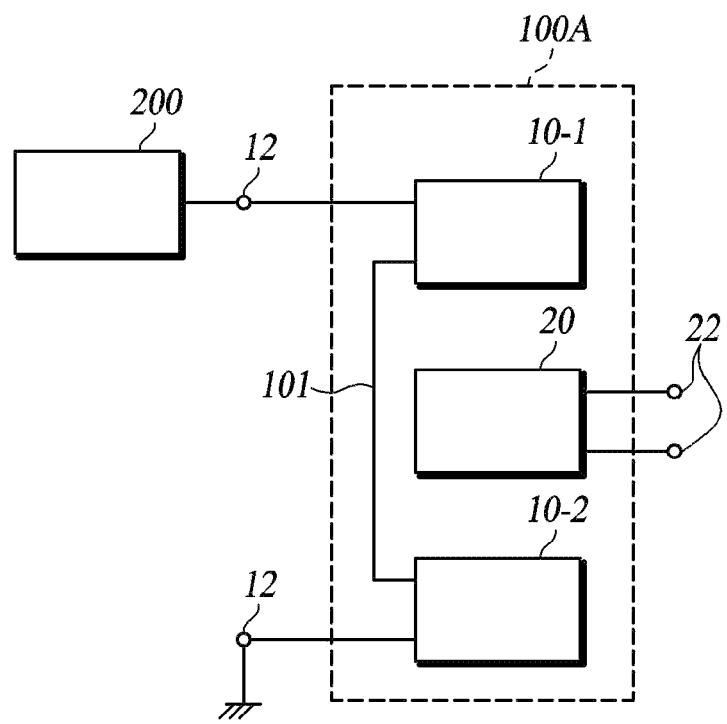
FIG. 3 is a block diagram showing the configuration of a non-rotating type DC generator according to a second embodiment of the present invention.

FIG. 3 is a block diagram of a non-rotating type DC generator according to a second embodiment of the present invention. In addition, in FIG. 3, the same reference numerals are assigned to parts substantially the same as those of the above-described embodiment, and detailed descriptions thereof are omitted. In this embodiment, the generator unit 100A is provided with the plurality of field magnets for one armature 10, and in this example, two field magnets 10-1 and 10-2. In this case, the first and second field magnets 10-1 and 10-2 have substantially the same configuration. The first and second field magnets 10-1 and 10-2 are suitably arranged with respect to the armature 20. In one preferred embodiment of the present invention, the first and second field magnets 10-1 and 10-2 are respectively disposed adjacent to both sides of the armature 20. In another embodiment, the field magnets 10-1 and 10-2 may be disposed on one side or the other side of the armature 20.

In this embodiment, one side of the input terminal of the first field magnet 10-1 is electrically coupled to the field magnet current input side from the driving unit 200, and the other side of the first field magnet 10-1 is connected to one side of the second field magnet 10-2 through the connection line 101, and the other input terminal of the second field 10-2 is grounded. That is, the first and second field magnets 10-1 and 10-2 are wired or coupled in series with respect to the field magnet input from the drive unit 200. Also, in another embodiment of the present invention, the first and second field magnets 10-1 and 10-2 may be coupled in parallel with respect to the field magnet current input from the driving unit 200.

In this embodiment, the plurality of field magnets 10-1 and 10-2 is installed for one armature 20 so that an electric field is more efficiently applied to the armature 20, so that the efficiency of the DC generator can be further increased.

Figure 4:
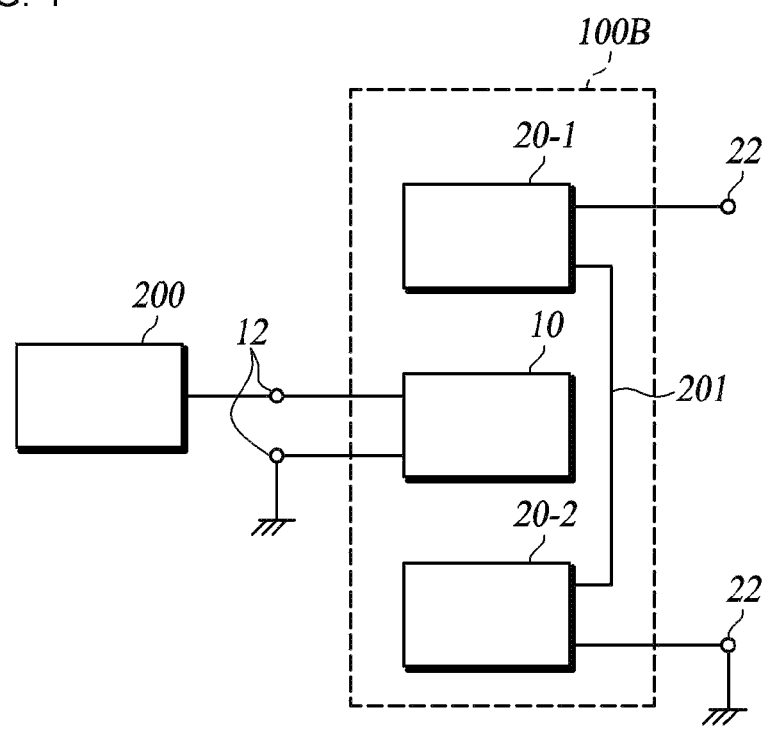
FIG. 4 is a block diagram showing the configuration of a non-rotating type DC generator according to a third embodiment of the present invention.

FIG. 4 is a block diagram of a non-rotating type DC generator according to a third embodiment of the present invention. In addition, in FIG. 4, the same reference numerals are assigned to parts substantially the same as those of the above-described embodiment, and detailed descriptions thereof are omitted. In this embodiment, the generator unit 100B is provided with the plurality of armatures 20-1 and 20-2 for one field magnet 10. Here, the first and second armatures 20-1 and 20-2 have substantially the same configuration. In addition, the first and second armatures 20-1 and 20-2 are appropriately disposed on one side or the other side of the field magnet 10, preferably, the first and second armatures 20-1 and 20-2 are disposed adjacent to both sides of the field magnet 20, respectively.

The output terminal 22 of the first and second armatures 20-1 and 20-2 may be coupled in series or in parallel. In the embodiment of FIG. 3, the other output terminal of the first armature 20-1 is electrically coupled to one output terminal of the second armature 20-2 through the connection line 201, so that the first and second armatures 20-1, 20-2 are coupled in series with respect to the output terminal 22 as a whole. In this embodiment, the plurality of armatures 20-1 and 20-2 is installed for one field magnet 10 so that the electric field generated by the field magnet 10 can be more efficiently utilized.

Figure 5:
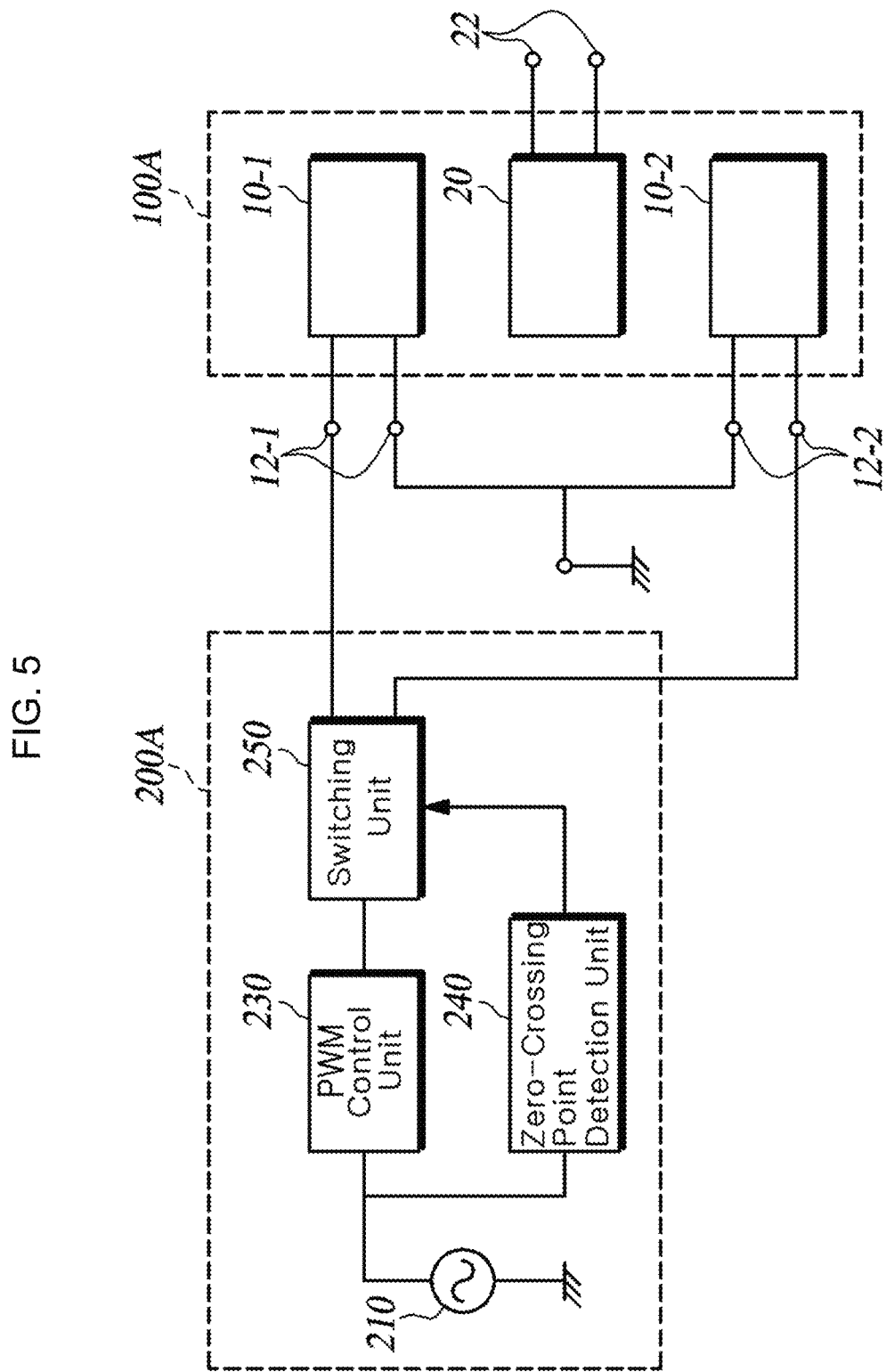
FIG. 5 is a block diagram showing the configuration of a non-rotating type DC generator according to a fourth embodiment of the present invention.

FIG. 5 is a block diagram of a non-rotating type DC generator according to a fourth embodiment of the present invention, which shows another configuration example of the drive unit 200A for driving the generator unit 100A. In addition, in this drawing, the same reference numerals are attached to the parts substantially the same as those of the above-described embodiment, and detailed descriptions thereof are omitted.

In the present embodiment, the driving unit 200A has the rectifying unit 220 removed from the configuration of FIG. 2. In addition, a switching unit 250 is provided for selectively supplying the AC current applied from the AC power source 210 to the first magnet field 10-1 and the second magnet field 10-2 of the generator unit 100A. The switching unit 250 is controlled by the detection signal of the zero crossing point detection unit 240. In the AC current output from the AC power supply 210, a first current flowing in a first direction and a second current flowing in a second direction opposite to the first direction are sequentially alternated. The zero-crossing point detection unit 240 detects the zero-crossing point at which the first alternating current and the second alternating current alternate, and outputs the detection signal. The switching unit 250 couples selectively the AC current applied from the AC power source 210 to the input terminal 12-1 of the first field magnet 10-1 or the input terminal 12-2 of the second magnet field magnet 10-2 based on the detection signal. In the first field magnet 10-1, the output current of the switching unit 250 is coupled to one side of the input terminal 12-1, and in the second field magnet 10-2, the output current of the switching unit 250 is coupled to the input terminal 12-2 is coupled to the other side. Accordingly, the field magnet current flowing through the first field magnet 10-1 and the field magnet current flowing through the second field magnet 10-2 are set to have the same direction. As a result, in the line 21 of the armature 20, a magnetic field in the same direction is interlinked when the first field magnet 20-1 is driven and when the second field magnet 20-2 is driven. An induced current in the same direction is always output from the output terminal 22.

Figure 6:
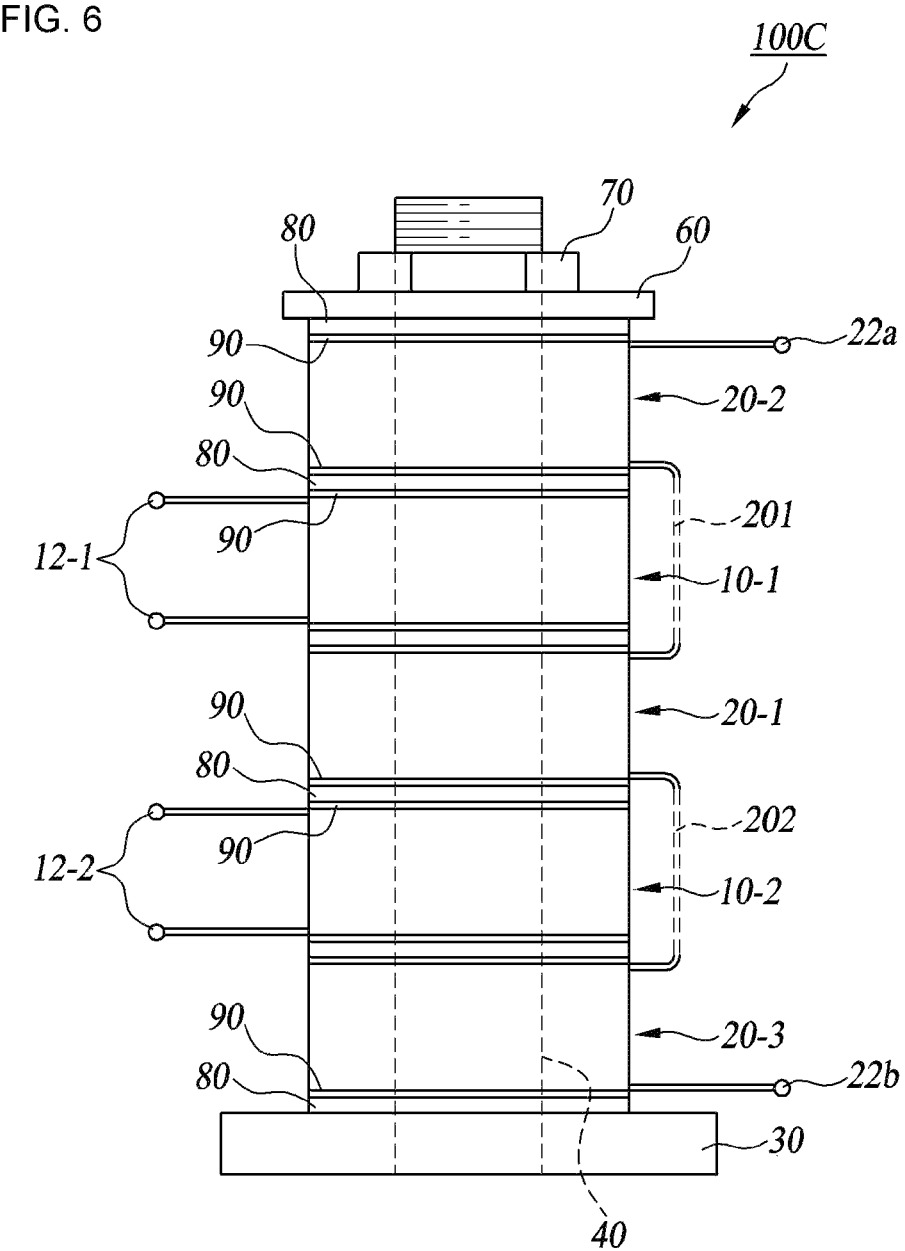
FIG. 6 is a front view schematically showing an external shape of a generator unit 100C or a DC generator according to a fifth embodiment of the present invention.
Figure 7:
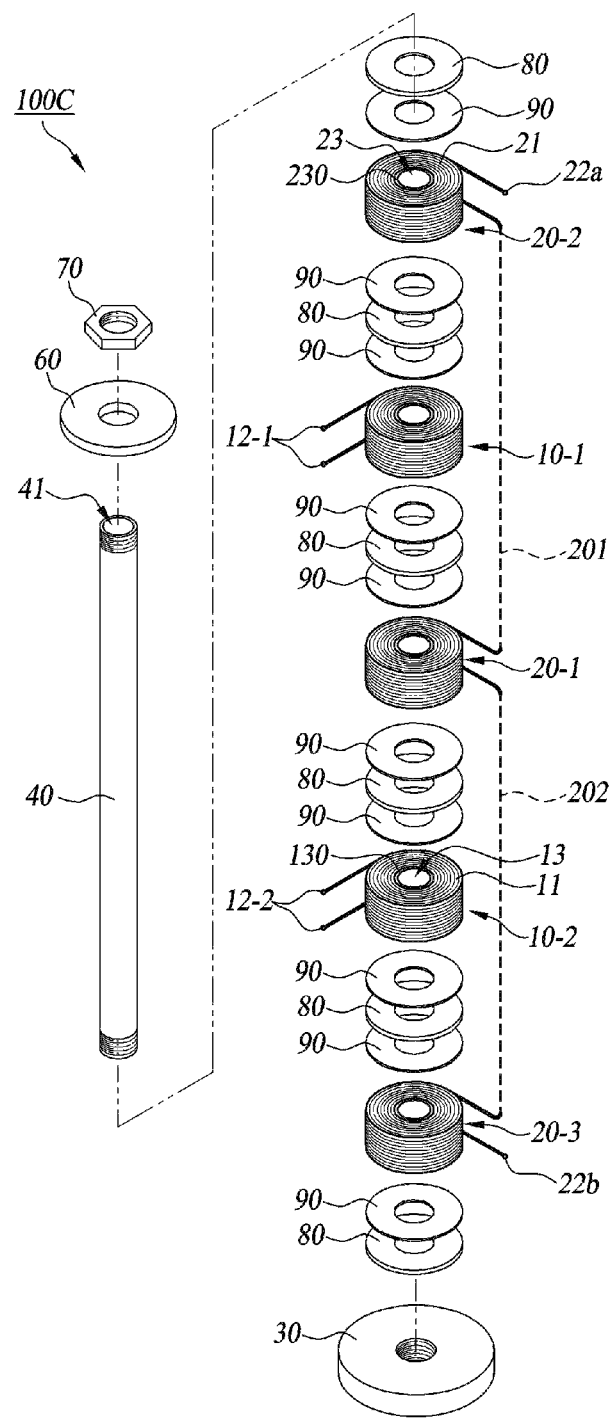
FIG. 7 is an exploded perspective view of the generator unit 100C or the DC generator shown in FIG. 6.

FIG. 6 is a front view schematically showing an external shape of a generator unit 100C or a DC generator according to a fifth embodiment of the present invention, and FIG. 7 is an exploded perspective view thereof. In FIG. 6, the generator unit 100C or the DC generator includes a base member 30 and a round bar-shaped core member 40 coupled to a central portion of the base member 30. The outer peripheral surface of the core member 40 has a shape corresponding to the shape of the hollow parts 13 and 23 of the field magnets 10-1 and 10-2 and the armatures 20-1, 20-2, 20-3, and the core member 40, the field magnets 10-1, 10-2, and the armatures 20-1, 20-2, 20-3 are configured to be disposed as closely as possible as a whole. And the core member 40 is preferably provided with a hollow 41 in the longitudinal direction. The hollow 41 is to prevent improper accumulation of thermal energy in the core member 41 by allowing air to smoothly flow through the inner side of the core member 41.

In the core member 40, the field magnets 10-1 and 10-2 and the armatures 20-1, 20-2, and 20-3 are alternately inserted along the outer peripheral surface thereof to be laminated or combined. In this embodiment, the first armature 20-1 is disposed in the space between the first and second field magnets 10-1 and 10-2 in the same manner as in the embodiments of FIGS. 3 and 4, and between the first armature 20-1 and the second armature 20-2 and between the first armature 20-1 and the third armature 20-3, respectively, the first field magnet 10-1 and the second field magnet 10-2 is placed respectively.

The first to third armatures 20-1 to 20-3 have substantially the same configuration and are coupled in series with each other to act as one armature as a whole. That is, in all of the first to third armatures 20-1 to 20-3, the line 11 is wound in the same direction, and one output end of the first armature 20-1 is connected to the second through the connecting line 201. While being electrically coupled to the other output terminal of the armature 20-2, the other output terminal of the first armature 20-1 is electrically coupled to one output terminal of the third armature 20-3 through the connection line 202. More specifically, the first to third armatures 20-1 to 20-3 are configured and coupled to generate an induced current flow in the same direction for an electric field in the same direction. And one output terminal 22a of the second armature 20-2 and the other output terminal 22b of the third armature 20-3 constitute an output terminal of an alternator.

In contrast, the input terminals 12-1 and 12-2 of the first field magnet 10-1 and the second field magnet 10-2 are connected to the driving units 200 and 200A in the same manner as in the embodiments of FIGS. 1 to 5, will be combined.

In a preferred embodiment of the present invention, insulating materials 130 and 230 are coated on the inner peripheral surfaces of the field magnets 10-1 and 10-2 and the armatures 20-1 to 20-3, respectively. The insulating materials 130 and 230 are formed between the field magnets 10-1 and 10-2 and the armatures 20-1 to 20-3 and the core member 40 inserted through the hollow portions 13 and 23 thereof. It is adopted for more reliable insulation.

A magnetic pole piece 80 is provided between the field magnets 10-1 and 10-2 and the armature 20-1 to 20-3, respectively. In addition, preferably, the pole pieces 80 are also installed on the uppermost and lowermost sides of the armature or field magnet, that is, the upper side of the second armature 20-2 and the lower side of the third armature 20-3 in this embodiment, respectively. In addition, an insulating plate 90 is provided between the pole piece 80 and the field magnets 10-1 and 10-2 and between the pole piece 80 and the armature 20-1 to 20-3, respectively. At this time, preferably, the cross-sectional shape and size of the pole piece 80 are set to be the same as those of the field magnets 10-1 and 10-2 and the armature 20-1 to 20-3. In addition, although not specifically shown in the drawings, the cross-sectional shape and size of the insulating plate 90 is set larger than that of the field magnets 10-1 and 10-2 and the armature 20-1 to 20-3 for stable insulation.

The material of the insulating plate 90 is not limited to a specific one. In order to most effectively apply the magnetic field generated by the field magnets 10-1 and 10-2 to the armature 20-1 to 20-3. It is necessary to reduce the separation distance of the field magnets 10-1 and 10-2 to the armature 20-1 to 20-3 to a minimum or preferably to make them close together. The insulating plate 90 prevents leakage current or sparks between the field magnets 10-1 and 10-2 or the armature 20-1 to 20-3 and the pole piece 80, or the field magnets 10-1 and 10-2 and the armature 20-1 to 20-3 so that the field magnets 10-1 and 10-2 and the armature 20-1 to 20-3 can be as close as possible.

In addition, in a preferred embodiment of the present invention, a material having a high elastic modulus and excellent impact resistance, such as polyethylene terephthalate (PET), is employed as the material of the insulating plate 80. As will be described later, the core member 40 and the pole piece 80 provide a magnetic path of the magnetic field generated in the field magnets 10-1 and 10-2, and the generated magnetic field generated in the field magnets 10-1 and 102 circulate while linking the armatures 20-1 to 20-3 as a whole. The first field magnet 10-1 and the second field magnet 10-2 are not driven continuously, and the driving time is duty-controlled by the PWM control unit 230 of the driving units 200 and 200A. Alternatively, the first field magnet 10-1 and the second field magnet 10-2 are not driven continuously but are driven or not driven according to the input of the field magnet current. Accordingly, the core member 40 and the magnetic pole piece 80 are repeatedly magnetized and demagnetized in response to the driving of the first and second magnetic field magnets 10-1 and 10-2. In addition, such magnetization and demagnetization may give an impact to the core member 40, in particular, the pole piece 80, thereby causing minute vibration or vibration in the pole piece 80. When vibration or the like occurs in the core member 40 and the pole piece 80, instantaneous deformation or distortion occurs in the magnetic path that circulates through it, resulting in a change in the magnetic field linked to the armatures 20-1 to 20-3. As a result, an undesirable change may occur in the induced current generated in the armatures 20-1 to 20-3. The insulating plate 80 is highly elastic and catches the shaking or vibration of the pole piece 80 and minimizes it, thereby preventing the flow of alternating current generated through the armatures 20-1 to 20-3 from being unnecessarily distorted.

As described above, the core member 40 and the pole piece 80 are provided for the smooth flow of the magnetic field generated by the field magnets 10-1 and 10-2. As the material of the core member 40 and/or the pole piece 80, a ferromagnetic material, preferably silicon steel having high magnetic permeability and low coercive force may be employed. However, silicon steel has relatively low electrical conductivity and the internal resistance value is easily increased by light or heat applied from the outside. When a magnetic path is formed through the core member 40 and the magnetic pole 80, the flow of current may be generated by itself in response to the fluctuation of the magnetic field. At this time, heat is generated in inverse proportion to the electrical conductivity of the core member 40 and the magnetic pole 80. That is, there is a problem in that the magnetic energy generated in the field magnets 10-1 and 10-2 is lost as thermal energy.

Figure 8:
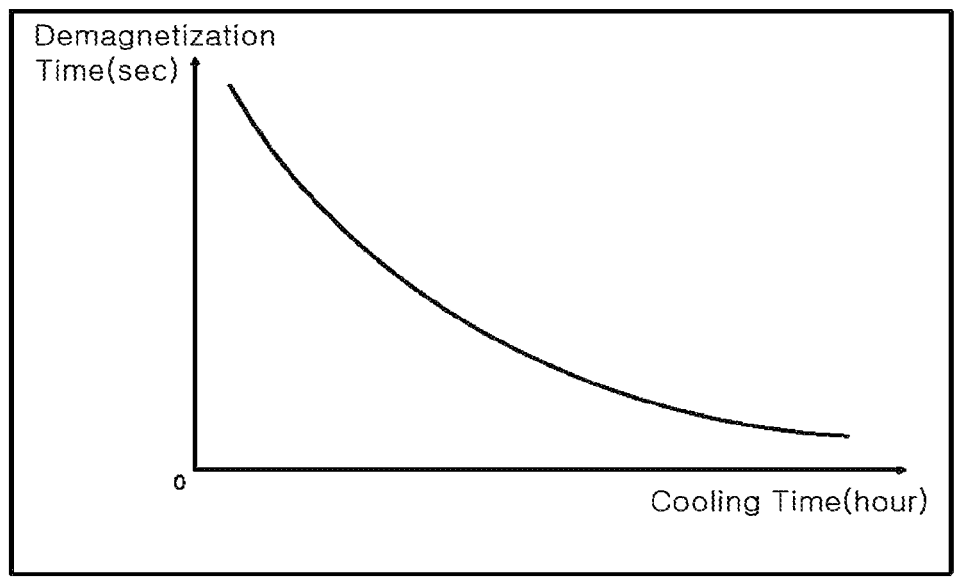
FIG. 8 is a graph showing the demagnetization time characteristics according to the cooling time of pure iron.

In another preferred embodiment of the present invention, pure iron, more preferably heat-treated pure iron is employed as the material of the core member 40 and/or the pole piece 80. Pure iron has high magnetic permeability and excellent electrical conductivity, but has relatively high coercive force. Since magnetic fields are applied to the core member 40 and the pole pieces 80 alternately or in various ways from the first field magnet 10-1 and the second field magnet 10-2, or the first field magnet 10-1 and the first and second magnetic fields generated by the second field magnet 10-2 are alternately applied, it is required for the material to have a fast demagnetization time, that is, a low coercive force. According to the research conducted by the present inventors, when pure iron is heated to a certain temperature or higher and then cooled slowly, the demagnetization time is shortened in response to the cooling time. FIG. 8 is a graph showing the demagnetization time characteristics according to the cooling time of pure iron. As a result of the study, it was confirmed that the demagnetization time could be shortened to 1/450 second or less if the temperature of pure iron heated to a certain temperature was gradually cooled for a sufficient time for more than 10 hours. In addition, if the cooling time of pure iron is delayed, an additional effect of improving magnetic permeability and electrical conductivity is obtained.

Figure 9:
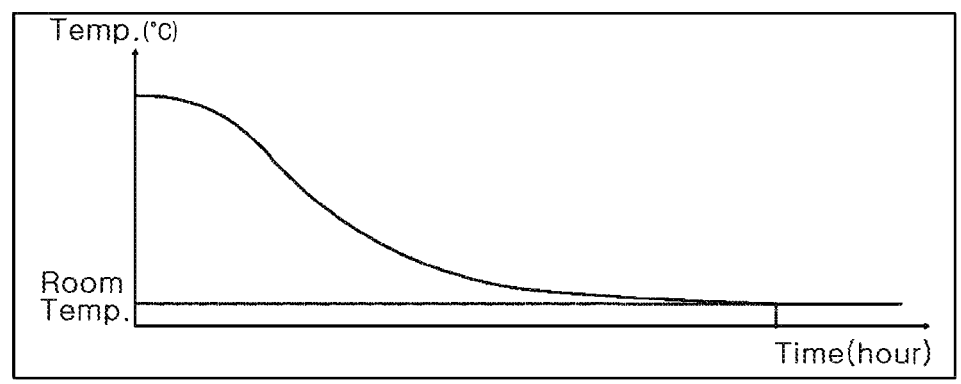
FIG. 9 is a graph showing a cooling characteristic curve according to time in the case of heat treatment of the core member 40 and the pole piece 80 in the present invention.

In the present invention, first, the core member 40 and the pole piece 80 are manufactured using pure iron, and then heat treatment is performed. The heat treatment is performed using, for example, a solid fuel such as black coal or white coal, preferably white coal. That is, during the heat treatment, the core member 40 and the pole piece 80 are put in a kiln together with the white coal, and the white coal is burned to heat the core member 40 and the pole piece 80 to 1000 to 1300 degrees or more. And by leaving the core member 40 and the pole piece 80 together at room temperature as it is, the white coal is naturally burned and extinguished, and then the core member 40 and the pole piece 80 are naturally cooled together with the white coal do. In this way, the temperature of the core member 40 and the pole piece 80 is gradually lowered in the process of burning and extinguishing the white coal, and thereafter, the core member 40 and the pole piece 80 are heated to room temperature by the latent heat of the white coal. It takes a considerable amount of time to cool down. FIG. 9 is a graph showing cooling characteristic curves according to time of the core member 40 and the pole piece 80 that are heat-treated through the above-described method. And, after the heat treatment is finished, impurities such as white charcoal are removed from the core member 40 and the pole piece 40, and finally, rust prevention treatment is performed with oil or the like.

FIGS. 6 and 7, in the case of assembling the alternator, the core member 40 is first fastened to the base member 30. Then, while inserting the pole piece 80 and the insulating plate 90 on the outside of the core member 40, sequentially stacking the armatures 20-1 to 20-3 and the field magnets 10-1 and 10-2 alternately, and then the cover 60 and the fastening member 70 are coupled. And finally, the connection between the first and second field magnets 10-1 and 10-2 and the first to third armatures 20-1 to 20-3 is executed using the connecting wires 201 and 202, by performing a connection between the generator unit 100 and the drive unit 200, the DC generator is completed.

Figure 10:
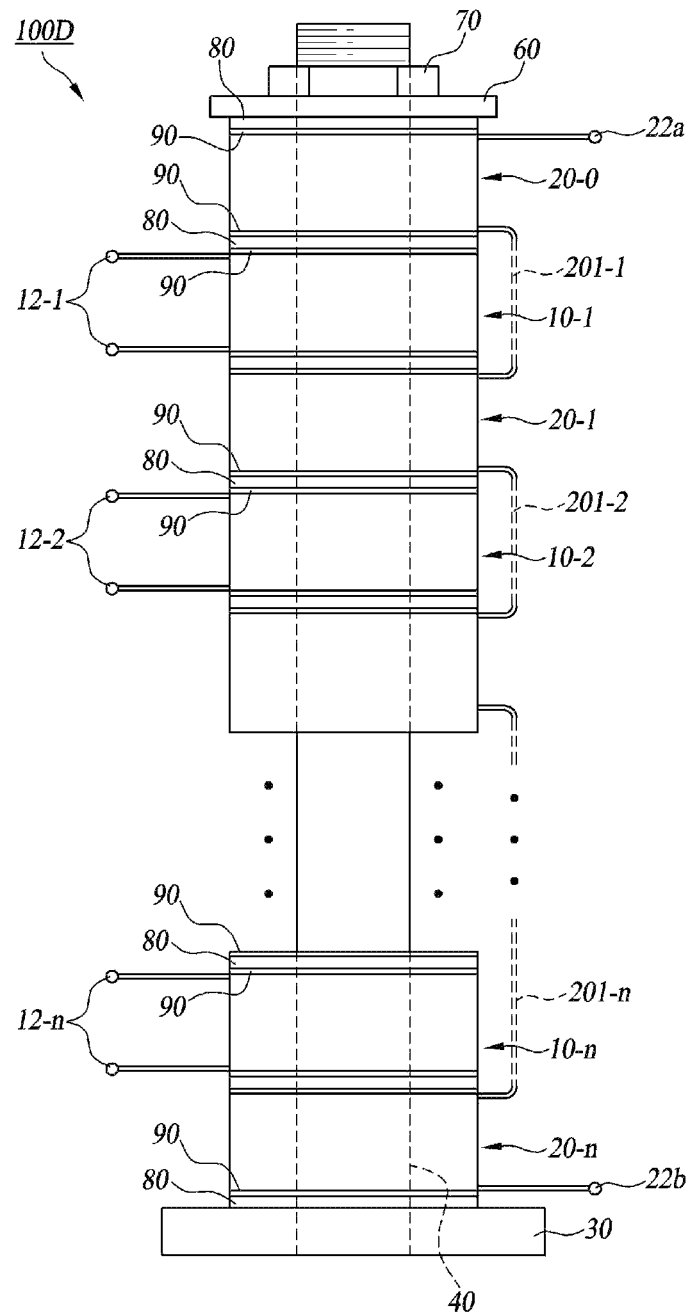
FIG. 10 is a front view schematically showing an external shape of a generator unit 100D or a DC generator according to a sixth embodiment of the present invention.

FIG. 10 is a front view schematically showing the external shape of the generator unit 100D or the DC generator according to the sixth embodiment of the present invention. In this embodiment, the core member 40 is fastened to the base member 30, and the core member 40 has the plurality of field magnets 10-1 to 10-$n$ and the plurality of armatures 20-0 to 20-$n$. The insulating plate 80 and the pole piece 90 are alternately laminated and bonded. At this time, the armatures 20-0 to 20-$n$ are configured and coupled to generate an induced current in the same direction with respect to the same magnetic field as in FIG. 6.

In addition, in this embodiment, the field magnets 10-1 to 10-$n$ are coupled to the driving units 200 and 200A in the same manner as in the embodiment of FIGS. 1 to 5. However, when the embodiment of FIG. 5 is applied to the generator unit 100D, n/2 field magnets among n fields constitute the first field magnet group, and the remaining n/2 field magnets constitute the second field magnet group. Preferably, the odd field magnets (10-1. 10-3, . . . , 10-($n$−1)) constitutes the first field magnet group, and the even field magnets (10-2. 10-4, . . . , 10-$n$) constitutes the second field magnet group. In this case, the configuration of each field magnet group can be performed by appropriately setting the winding direction of the lines constituting each field magnet or by appropriately setting the connection method of the field magnet current supplied to these field magnets. The first field magnet group and the second field magnet group are driven synchronously, respectively, and the first field magnet group and the second field magnet group are driven alternately to form a magnetic field in the same direction as a whole. Field magnets constituting the first field magnet group and the second field magnet group may be wired in various ways. Input terminals of the first field magnet group and the second magnet field group may be connected in series with each other, so that the first and second field magnet groups may be connected in series with respect to one field magnet current input, respectively. Also, each of the first field magnet group and the second field magnet group may be connected in parallel with respect to one field magnet current input.

In this embodiment, a plurality of field magnets 10-1 to 10-$n$ and armatures 20-0 to 20-$n$ are provided, so that various DC power can be generated as needed. In addition, since other parts are substantially the same as in the above-described embodiment, the same reference numerals are attached to the same parts as in the embodiment, and detailed descriptions thereof are omitted.

Figure 11:
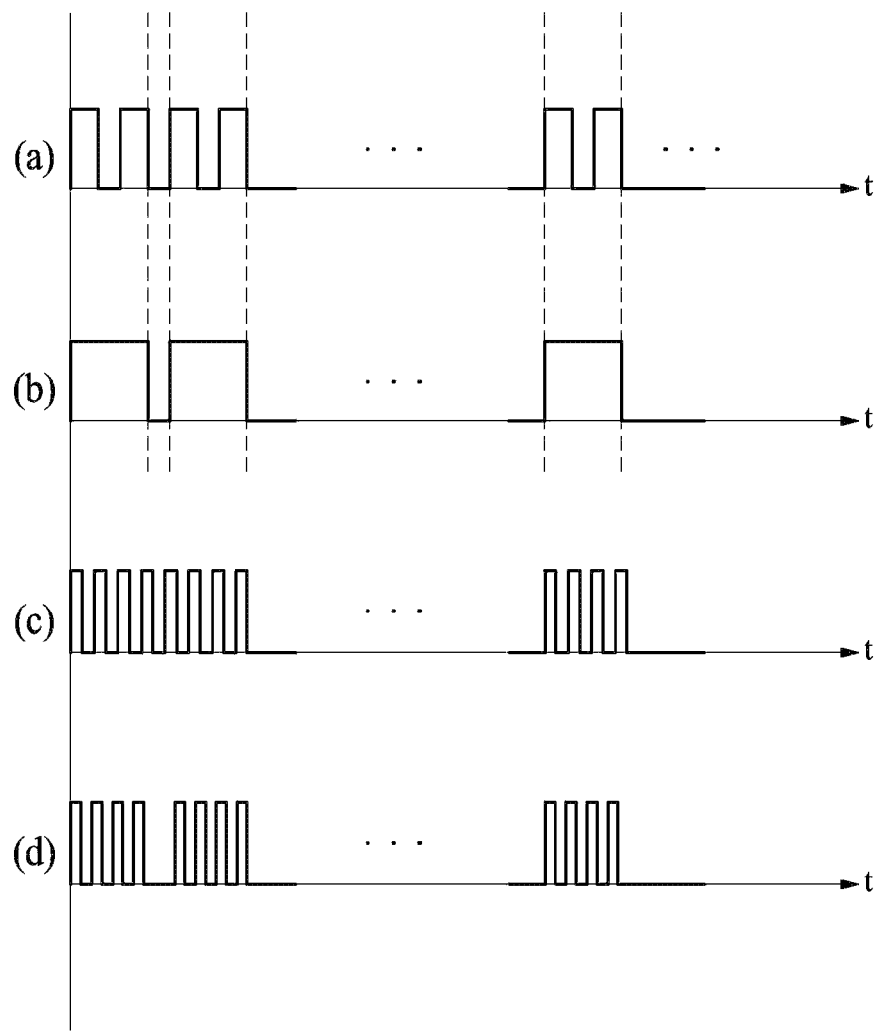
FIG. 11 is a waveform diagram showing an example of the field magnet current supplied to the input terminal 12 of the field magnet 10 in FIG. 1.

FIG. 11 is a waveform diagram showing an example of the field magnet current supplied to the input terminal 12 of the field magnet 10. As a method of adjusting the output of the DC generator in FIG. 11, for the basic field magnet current shown in (a), the duty ratio is adjusted as shown in (b) or the frequency is adjusted as shown in (c), or (d) and a method of adjusting the duty ratio and the frequency together may be considered.

When the field magnet current is supplied to the input terminal 12 of the field magnet 10, the field magnet current flows through the line 11 of the field magnet 10, and accordingly, the traveling direction of the line corresponds to the winding direction of the line 11. A magnetic field is formed in a direction perpendicular to the direction in which the magnetic field is formed can be defined by Ampere's right hand screw rules. The magnetic field generated in the field magnet 10 is linked in a vertical direction with respect to the line 21 of the armature 20. In addition, current flow is generated in the line 21 of the armature 20 in a predetermined direction corresponding to the direction of the magnetic field and the winding direction of the line 21. At this time, the magnitude of the induced current will correspond to the strength of the magnetic field and its change amount. And the induced current flowing through the line 21 is output to the outside through the output terminal 22 of the armature 20.

In the above configuration, the desired DC power is outputted through the armature 20 by arranging the field magnet 10 and the armature 20 in an adjacent position and supplying the field current appropriately to the field magnet 10.

Figure 12:
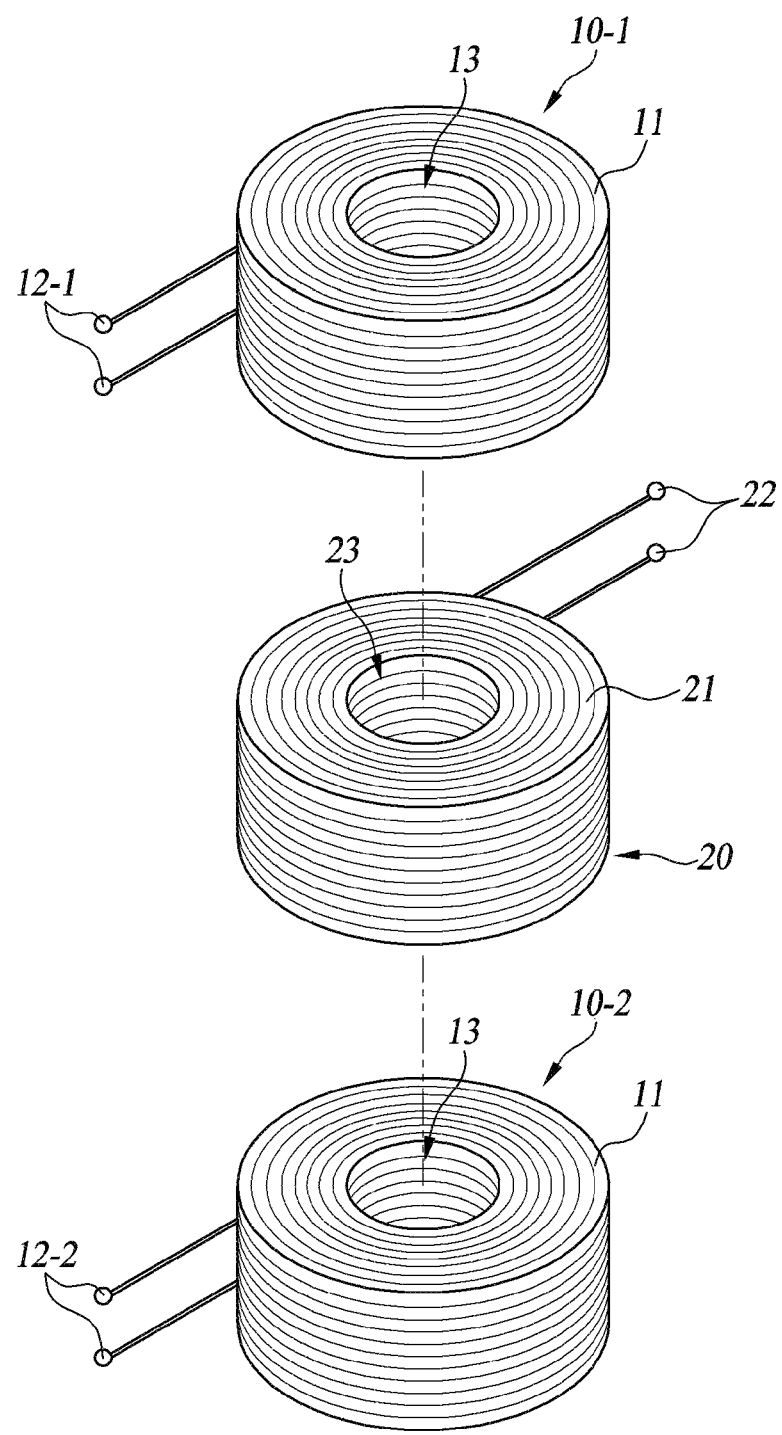
FIG. 12 is a block diagram showing the configuration of a DC generator according to a seventh embodiment of the present invention.

FIG. 12 is a block diagram illustrating a non-rotating type DC generator according to a seventh embodiment of the present invention. In addition, in FIG. 11, the same reference numerals are given to parts substantially identical to those of FIG. 1, and a detailed description thereof will be omitted.

In this embodiment, the plurality of field magnets is provided for one armature 10, and in this example, two field magnets 10-1 and 10-2 are provided. In this case, the first and second field magnets 10-1 and 10-2 have substantially the same configuration. The first and second field magnets 10-1 and 10-2 are suitably arranged with respect to the armature 20. Preferably, the first and second field magnets 10-1 and 10-2 are respectively disposed adjacent to both sides of the armature 20. Also, in another embodiment, the field magnets 10-1 and 10-2 may be disposed on one side or the other side of the armature 20.

Figure 13:
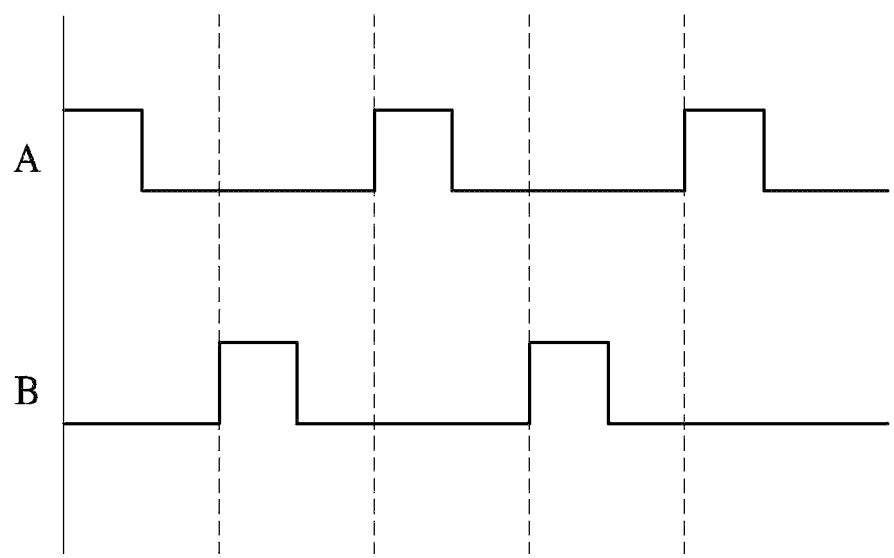

In this embodiment, the first and second field magnets 10-1 and 10-2 are coupled in series or parallel to the field magnet input. In addition, in another preferred embodiment, a field magnet current is selectively or alternately applied to the first and second field magnets 10-1 and 10-2, so that the first and second field magnets 10-1 and 10-2 are individually applied and can be driven. FIG. 13 shows an example of the field magnet current supplied through the input terminals 12-1 and 12-2 of the first and second field magnets 10-1 and 10-2 in the case of selectively driving the first and second field magnets 10-1 and 10-2. In the drawing, A indicates the field magnet current input through the first input terminal 12-1, and B indicates the field magnet current input through the second input terminal 12-2. In addition, in the present embodiment, each of the field currents A and B may have their duty ratio and frequency appropriately changed as shown in (b) and (c) of FIG. 11. In addition, in this example, the driving periods of the first field magnet 10-1 and the second field magnet 10-2 do not necessarily need to be alternately driven, and some driving periods may overlap. The driving method of the first field magnet 10-1 and the second field magnet 10-2 is not limited to a specific method.

In the core member 40, the field magnets 10-1 and 10-2 and the armatures 20-1, 20-2, and 20-3 are alternately inserted along the outer peripheral surface thereof to be laminated or combined. In this embodiment, as in FIG. 12, the first armature 20-11 is disposed inside the first and second field magnets 10-1 and 10-2, that is, in the space therebetween, and in addition to this, the first and second of the second field magnets 10-1 and 10-2. The second armature 20-2 and the third armature 20-3 are respectively arranged to the outside the first and second field magnets 10-1 and 10-2.

The first to third armatures 20-1 to 20-3 have substantially the same configuration and are coupled in series with each other to act as one armature as a whole. That is, in all of the first to third armatures 20-1 to 20-3, the line 11 is wound in the same direction, and one output end of the first armature 20-1 is connected to the second through the connecting line 201. While being electrically coupled to the other output terminal of the armature 20-2, the other output terminal of the first armature 20-1 is electrically coupled to one output terminal of the third armature 20-3 through the connection line 202. More specifically, the first to third armatures 20-1 to 20-3 are configured and coupled to generate an induced current flow in the same direction for an electric field in the same direction. And one output terminal 22a of the second armature 20-2 and the other output terminal 22b of the third armature 20-3 constitute an output terminal of the alternator. In addition, field magnet currents are appropriately supplied to the input terminals 12-1 and 12-2 of the first field magnet 10-1 and the second field magnet 10-2 according to the method described with reference to FIGS. 11 and 4.

In addition, in the present embodiment, the field magnets 10-1 to 10-n are coupled to the field magnet current in the same manner as in FIGS. 11 and 13. However, when the example of FIG. 13 is applied, n/2 field magnets among n field magnets constitute the first field magnet group, and the remaining n/2 field magnets constitute the second field magnet group.

Preferably, the odd field magnets (10-1, 10-3, ..., 10-(n−1)) constitutes the first field magnet group, and the even field magnets (10-2, 10-4, ..., 10-n) constitutes the second field magnet group. In this case, the configuration of each field magnet group can be performed by appropriately setting the winding direction of the lines constituting each field magnet or by appropriately setting the connection method of the field magnet current supplied to these field magnets. The first and second field magnet groups are driven synchronously, respectively, and the first and second field magnet groups form magnetic fields in the same direction as a whole. Field magnets constituting the first field magnet group and the second field magnet group may be wired in various ways. Input terminals of the first field magnet group and the second field magnet group may be connected in series with each other, so that the first and second field magnet groups may be connected in series with respect to one field magnet current input, respectively. Also, each of the first field magnet group and the second field magnet group may be connected in parallel with respect to one field magnet current input.

An embodiment according to the present invention has been described above. However, the present invention is not limited to the above embodiment and can be implemented with various modifications. For example, the configuration and coupling structure of the base member 30, the cover 60, and the fastening member 90 employed to configure the alternator in the above embodiment are for explaining one structural example constituting the generator, the present invention is not limited to these structures and examples. The present invention can provide its technical effects through the configuration and coupling structure of the core member 40 and the field magnet 10 and the armature 20 coupled thereto, and the structure and configuration employed for their installation are essential and it will be readily understood by those skilled in the art that this is not the case.

Also, the embodiment of FIG. 6 may be equally applied to the embodiments of FIGS. 1 to 5. That is, in the embodiment of FIGS. 1 to 5, the field magnet 10 and the armature 20 are disposed while being inserted into the core member 40, and between the field magnet 10 and the armature 20, the magnetic pole piece 80 and an insulating plate 90 may be disposed.

INDUSTRIAL APPLICABILITY

According to the present invention having the above configuration, a desired DC current is generated from the armature by stacking and arranging the field and the armature with respect to the core member and appropriately supplying the field magnet current to the field magnet. Accordingly, in the present invention, a mechanical structure for rotationally driving a field magnet or an armature is unnecessary, and since the commutator can be removed, the structure of the DC generator can be greatly simplified and reduced in weight.

In addition, in the present invention, since the DC generator is configured as a non-rotating type, energy loss due to friction generated during the rotation of the field magnet or armature is minimized. Accordingly, the power generation efficiency of the generator can be significantly improved.

The invention claimed is:

1. A non-rotating type direct current (DC) generator for generating a DC current comprising:
a drive unit and a generator unit, wherein the generator unit includes a round bar-shaped core member, a field magnet in which an electric line is wound and a first hollow portion is formed in the central portion, the field magnet disposed on the outside of the core member through the first hollow, an armature in which an electric line is wound and a second hollow portion is formed in the central portion, the armature disposed on the outside of the core member through the second hollow portion, and a pole piece which is provided between the field magnet and the armature, and insulating plates which are disposed between the field magnet and the pole piece and between the armature and the pole piece, and wherein the drive unit supplies the field magnet current to the generator unit on the basis of the alternating current of AC power source, wherein the core member or the pole piece is made of pure iron and subjected to heat treatment, and wherein in the heat treatment, the core member or the pole piece is put in a kiln together with a solid fuel, and the solid fuel is burned to heat the core member or the pole piece to a certain temperature or higher, and then the core member or the pole piece is naturally cooled together with the burned solid fuel.

2. The non-rotating type DC generator according to claim 1, wherein the solid fuel is white coal.

3. The non-rotating type DC generator according to claim 1, wherein the core member or the pole piece is surface-treated with oil.

4. The non-rotating type DC generator according to claim 1, wherein a plurality of the field magnet and the armature are provided, and the field magnet and the armature are alternately arranged.

5. The non-rotating type DC generator according to claim 4, wherein the plurality of armatures is connected in series with each other.

6. The non-rotating type DC generator according to claim 4, wherein the plurality of field magnets is divided into a first field magnet group and a second field magnet group, and the first field magnet group and the second field magnet group are alternately driven.

7. The non-rotating type DC generator according to claim 6, wherein the first or second field magnet group is connected in series or in parallel with respect to the field magnet current input, respectively.

8. The non-rotating type DC generator according to claim 4, wherein the plurality of field magnets is divided into a first field magnet group and a second field magnet group, and the first and second field magnet groups are each driven synchronously.

9. The non-rotating type DC generator according to claim 8, wherein the first or second field magnet groups are respectively connected in series or parallel to the field magnet current input.

* * * * *